US00RE48252E

(19) United States
(12) Reissued Patent
Curtis

(10) Patent Number: US RE48,252 E
(45) Date of Reissued Patent: Oct. 13, 2020

(54) PONTOON BOAT

(71) Applicant: Triton Industries, Inc., Lansing, MI (US)

(72) Inventor: David J. Curtis, Dewitt, MI (US)

(73) Assignee: TRITON INDUSTRIES, INC., Lansing, MI (US)

(21) Appl. No.: 14/290,900

(22) Filed: May 29, 2014

Related U.S. Patent Documents

Reissue of:
(64) Patent No.: 8,186,291
Issued: May 29, 2012
Appl. No.: 13/117,177
Filed: May 27, 2011

U.S. Applications:
(63) Continuation of application No. 11/206,870, filed on Aug. 19, 2005, now Pat. No. 7,950,340.

(51) Int. Cl.
*B63B 1/00* (2006.01)
*B63B 1/20* (2006.01)
*B63B 1/12* (2006.01)

(52) U.S. Cl.
CPC ..... *B63B 1/20* (2013.01); *B63B 1/125* (2013.01)

(58) Field of Classification Search
CPC ..... B63B 1/20; B63B 1/125
USPC ..... 114/61.1, 61.2, 283, 290, 292
See application file for complete search history.

(56) References Cited

U.S. PATENT DOCUMENTS 523,518 A * 7/1894 Foerste ..... 114/57
650,479 A 5/1900 Pepin
2,066,101 A 12/1936 Dunlap et al.
2,989,939 A * 6/1961 Tatter ..... B63B 1/20 114/61.32
3,077,851 A 2/1963 Bamberger ..... 114/62
3,528,380 A 9/1970 Yost
3,796,177 A 3/1974 Szpytman
3,996,871 A * 12/1976 Boismard ..... B63B 1/20 114/283
D244,841 S 6/1977 Nescher
4,348,972 A 9/1982 Parsons
D310,656 S 9/1990 Paine, Jr.
4,964,357 A 10/1990 Genfan
5,184,561 A * 2/1993 Nickell, Jr. ..... 114/292
5,367,974 A 11/1994 Moraga et al.
5,427,554 A 6/1995 Foglia
D382,850 S 8/1997 Schmidt
5,784,977 A 7/1998 Schell et al.
D416,852 S 11/1999 Clarke
5,983,823 A 11/1999 Allison
6,003,458 A 12/1999 Valliere ..... 114/61.18
(Continued)

OTHER PUBLICATIONS

JC Pontoon, "Unique Hull Design", 4 pages relating to website jcpontoon.com archived to Aug. 3, 2004 by Wayback Machine.*

(Continued)

*Primary Examiner* — Robert M Fetsuga
(74) *Attorney, Agent, or Firm* — Clark & Brody LP

(57) ABSTRACT

A pontoon boat having enhanced handling characteristics includes a deck, a central pontoon mounted to said deck, two outer pontoons mounted to said deck on respective opposite sides of said central pontoon, and a motor, wherein the central pontoon extends below the outer pontoons to create a V-shaped hull, and the motor is capable of causing said center and outer pontoons to plane during normal operation.

26 Claims, 2 Drawing Sheets

Amended

(56) References Cited

U.S. PATENT DOCUMENTS

| | | | | |
|---|---|---|---|---|
| 6,216,622 | B1 | 4/2001 | Lindstrom et al. | |
| 6,729,258 | B1 | 5/2004 | Fuglsang et al. | |
| 7,950,340 | B1 * | 5/2011 | Curtis | 114/61.1 |
| 2003/0136322 | A1 | 7/2003 | Armstrong | |
| 2005/0247252 | A1 | 11/2005 | Brown | |

OTHER PUBLICATIONS

Manitou Boats News/FAQ page, http://manitouboats.com Jan. 10, 2005.
Best of '05 article, boatinglife.com May 2005.
TriToon Series publication, Oct. 11, 1999.

* cited by examiner

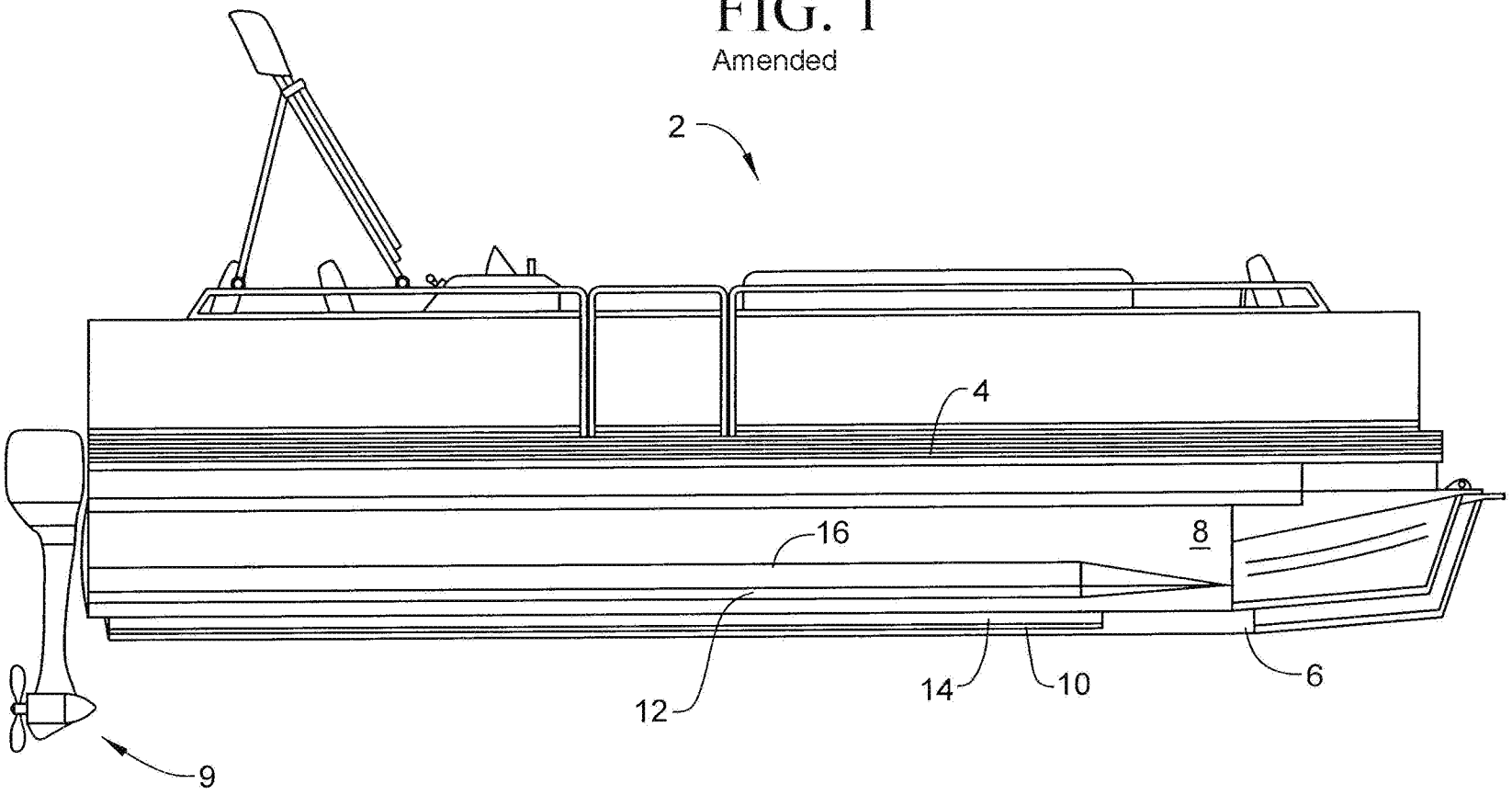
FIG. 1
Amended

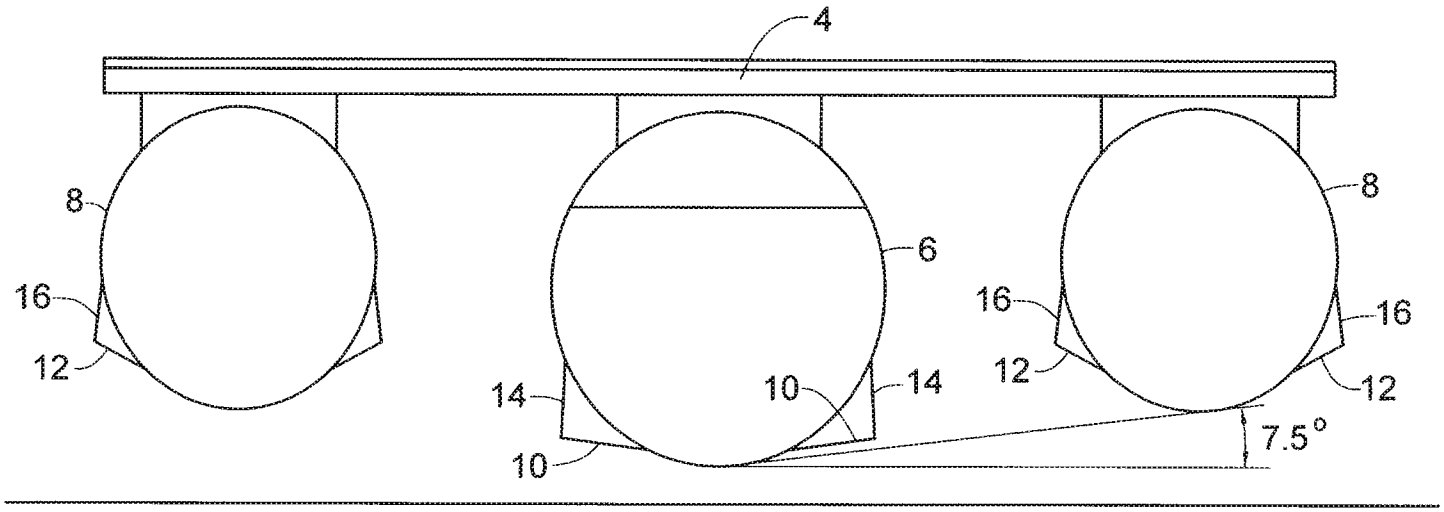
FIG. 2
Amended

PONTOON BOAT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation of U.S. application Ser. No. 11/206,870, which was filed on Aug. 19, 2005 and is now U.S. Pat. No. 7,950,340, the disclosure of which is hereby incorporated by reference.

TECHNICAL FIELD

This invention relates to the art of pontoon boats. In particular, the invention relates to a high performance pontoon boat with characteristics that simulate that of a planing V-hull boat.

BACKGROUND ART

A popular type of boat is a pontoon boat. A pontoon boat includes, generally, pontoons that support a boat deck that, in turn, accommodates the passengers. Pontoons on such boats are generally designed as displacement structures, meaning that they support the weight of the boat and passengers by displacement of water, even when the boat is moving through the water at normal, design, operating speeds. In contrast, another type of boat hull is designed to support the weight of the boat by the kinematical forces applied to the hull by the water when the boat is moving at operating speeds. This latter type of hull is commonly known as a "planing" type of hull.

The planing type of hull is generally used for boats that operate at higher speeds and require more maneuverability, such as a boat for pulling a water skier. Users of pontoon boats, however, often want to run at higher speeds, for example, to pull water skiers. While it is not difficult to provide a pontoon boat with an engine having the horsepower to drive a pontoon boat at higher speeds, it has been difficult to provide a pontoon hull with handling characteristics similar to those of a V-hull such that the boat can be safely used in higher-speed activities.

A typical problem with a pontoon boat is its tendency to rotate toward the outside of a turn. This is an unstable motion, which if done at high speeds can be very dangerous. A planing type V-hull naturally tends to rotate toward the inside of a turn, which lends stability to that type of hull and allows it to be used at higher speeds. Thus, there is a need for a higher powered, sport type pontoon boat that handles safely at higher speeds.

SUMMARY OF THE INVENTION

It is an object of this invention to provide an improved sport-type pontoon boat that provides handling characteristics similar to those of a sport boat or V-hull boat with a planing hull. In accordance with the invention, the pontoons of a pontoon boat having an engine of adequate horsepower to operate normally at planing speeds are arranged with respect to each other and to the boat deck such that the hull exhibits handling characteristics similar to those provided by a V-hull. Alternatively the pontoons are further provided with planing elements that enhance the V-shape of the hull.

In a preferred embodiment, the boat hull is provided with three, generally parallel, pontoons that act as displacement hulls when the boat is stationary or operating at low speeds. The center pontoon, however, is configured such that when all three pontoons are considered, the overall cross sectional shape of the hull is that of a "V." Combination of this hull with an engine capable of causing the boat to reach planing speed results in a highly maneuverable pontoon boat.

In the traditional pontoon boat, the pontoons are generally cylindrical on the lower half. In some designs (e.g., U.S. Pat. No. 5,784,977), the surface is not strictly cylindrical and may include planar components. While other configurations are possible, in the preferred embodiment of the invention, the pontoons are also generally cylindrical on the lower half, but the diameter of the central pontoon is larger than those of the outer two pontoons. The larger central pontoon and the smaller flanking pontoons are mounted to the boat deck to provide a V-shape to the overall configuration of the hull. In one embodiment, the larger central pontoon is sufficient to generate the V-shape if the tops of the cylindrical pontoons, or the continuations of the cylindrical shape of the lower part of the pontoon are aligned.

In accordance with an alternative feature of the invention, the central pontoon of larger diameter is mounted to the deck lower than the outer pontoons, which further emphasizes the overall V-shape of the hull.

In accordance with a still further feature of the invention, the pontoons are provided with lifting strakes that are angled upwardly to further enhance the V-shaped hull configuration and to provide enhanced handling characteristics.

It is an object of this invention to provide a pontoon style boat that has handling characteristics similar to those of a boat having a V-shaped planing hull.

BRIEF DESCRIPTION OF THE DRAWINGS

FIG. 1 is a side view of a pontoon boat in accordance with the invention.

FIG. 2 is a transverse cross section of the deck and pontoons of the boat of FIG. 1.

DETAILED DESCRIPTION OF THE PREFERRED EMBODIMENTS

With reference to the drawing figures, FIG. 1 illustrates a pontoon boat 2 in accordance with the invention. The pontoon boat 2 includes a deck 4 and at least three pontoons to support the weight of the boat in water. Pontoon 6 extends longitudinally and is located transversely in the center of the boat. Two additional pontoons 8 extend parallel to pontoon 6 and are located symmetrically on either side of pontoon 6. A motor 9 may be mounted to the central pontoon.

To provide the pontoon boat of the invention with handling characteristics similar to those of a planing V-hull, the pontoons 6 and 8 are configured and positioned with respect to each other to provide an overall V-hull configuration, and the boat is powered by a motor 9 that is large enough to drive the boat at planing speeds during normal operating conditions.

One feature of the arrangement shown in FIG. 2 is that the diameter of the center pontoon 6 is larger than the diameters of the outer pontoons 8. A pontoon is primarily a displacement-type structure, and it will be appreciated that pontoon 6 is capable of displacing more water than either of the outer tubes. More importantly, however, pontoon 6 is mounted with respect to outer pontoons 8 such that it extends further into the water than do the pontoons 8. By these features, the overall configuration of the three pontoons is that of a "V."

Another feature of the hull in accordance with the invention is the use of lifting strakes on each of the pontoons to further simulate a V-shaped planing hull and to provide handling characteristics of such a hull. Thus, pontoon 6 includes strakes 10, and pontoons 8 include strakes 12. These strakes extend along the pontoons for the major part of their lengths, and taper toward the pontoon surface near the bow of the boat. The strakes are generally flat, rectangular surfaces and are located and oriented to provide the desired handling characteristics. The generally flat strakes are supported by vertical surfaces 14 and 16, respectively. These vertical surfaces mainly support the strake surfaces but must also be configured to reduce drag. In the preferred embodiment, the vertical surfaces 14 and 16 are solid surfaces whereby the strake and the support are essentially triangular in cross section as shown in the figures.

While the boat 2 may be of almost any length, in preferred embodiments the boat is from 18 to 32 feet in length and more preferably 22 to 26 feet in length. The diameters of the pontoons vary according to the design-weight of the boat, and for a boat of 18 to 32 feet, the diameter of the center pontoon would be from 20 to 32 inches and preferably from 25 to 27 inches. The diameters of the outer pontoon may be 18 to 30 inches and preferably 23 to 25 inches. In a specific preferred embodiment, a boat of 22 to 26 feet would have a central pontoon of 25-inch diameter and outer pontoons of 23-inch diameter. In a second preferred embodiment, a boat of 22-26 feet in length would have a central pontoon of 27-inch diameter and outer pontoons of 25-inch diameter. In a third preferred embodiment of a boat 22-26 feet, the diameter of the outer pontoons would be 23 inches and that of the center pontoon 27 inches.

As noted, the central pontoon is mounted such that it extends further into the water than the outer pontoons. In a preferred arrangement, the central pontoon is mounted such that its bottom surface is 2 to 8 inches below the bottom surfaces of the outer pontoons. In a most preferred embodiment, the bottom surface of the central pontoon is 5 to 5¼ inches below the bottom surface of the outer pontoons. The outer pontoons are mounted laterally with respect to the central pontoon such that the angle of a line connecting the lowermost parts of the central and outer pontoons is 2 to 22 degrees and preferably about 7.5 degrees with respect to the horizontal.

The strakes 10 and 12 are designed to provide additional surface area to allow the hull of the invention to plane more easily and to simulate a V-hull. Thus, the strakes 10 on the central pontoon are placed at a smaller angle with respect to the horizontal than the strakes 12. The surface of strake 10 may be placed at an angle of from 7 to 10.5 degrees with respect to the horizontal and is preferably about 8.7 degrees. The strake 12 may be placed at an angle of from 21 to 32 degrees and is preferably about 26.4 degrees with respect to the horizontal.

The horizontal extent of the strakes depends on the required surface area. For a boat of 22-26 feet in length, the strakes on the smaller pontoons would be from about 4.5 to about 5.5 inches in width and preferably about 5 inches. In the preferred embodiment, the outer edge of the strake is about 12¼ inches from the center of the smaller pontoon. The strakes on the larger, central pontoon would be from about 6.4 inches to about 7.7 inches in width and preferably about 7 inches. In the preferred embodiment, the outer edge of the strake is about 13 inches from the center line of the central pontoon.

The provision of a motor adequate to cause the pontoons to achieve planing speeds is important to achieving the desired handling characteristics. This feature may be defined by the ratio of weight to horsepower, which in the preferred embodiment is about 31 pounds per horsepower or less. Thus, if one considers the weight of the boat, motor, average fuel and at least one occupant on the one hand and the indicated horsepower of a motor that would ordinarily be used on this type of boat on the other, it requires at least one horsepower per 31 pounds to drive the described hull at planing speeds to achieve the desired handling characteristics of a boat according to the invention. In a more preferred embodiment, for boats 20-26 feet in length, the pounds-per-horsepower should be less than about 21 and more preferably less than about 19.

In a specific embodiment of the invention, a 24 foot pontoon boat has a center pontoon of 27 inches, outer pontoons of 23 inches, a dry weight of 2,715 pounds and is powered by a 225 horsepower V-6 outboard motor. In this embodiment, the bottom of the center pontoon is about five inches below the bottom the outer pontoons.

It will be further appreciated that the motor 9 will ride lower in the water than in a pontoon boat where the center tube is not deeper than the outer pontoons.

Modifications within the scope of the appended claims will be apparent to those of skill in the art.

I claim:

1. A pontoon boat having an overall length of about 18 to about 32 feet comprising a deck, a central pontoon, two outer pontoons on respective opposite sides of said central pontoon, said deck extending above said central and said two outer pontoons, and a motor, wherein said central pontoon and said outer pontoons are of generally cylindrical configuration at least on their lower halves and further comprise planing elements, said central and outer pontoons supporting the entire weight of the boat and passengers by displacement when the boat is stationary and positioned in substantially fixed relationship with respect to each other such that said central pontoon extends below transversely adjacent portions of said outer pontoons in at least a substantial portion of the aft section of said boat to provide a V-shape to the overall cross-sectional configuration of said central and outer pontoons and to provide greater buoyancy in the central longitudinal part of said boat than at either of the outer longitudinal parts of said boat, and the displacement and planing characteristics of said central and outer pontoons are such that said central pontoon and at least one of said outer pontoons are always in displacement or planing contact with water during normal operation and said boat heels into turns, the width of said central pontoon is from about 20 to about 32 inches, the width of each of said outer pontoons is from about 23 to about 25 inches, and said motor is capable of causing said center and outer pontoons to plane during said normal operation, *and wherein said planing elements comprise lifting strakes on each of said central and outer pontoons, said strakes being angled upwardly from a respective pontoon.*

2. A pontoon boat according to claim 1 wherein the weight to horsepower ratio of said boat is about 31 pounds per horsepower or less.

3. A pontoon boat according to claim 2 wherein said weight to horsepower ratio is from about 19 to about 21.

4. A pontoon boat according to claim 1 wherein said overall length is from about 22 to about 26 feet, the width of said central pontoon is about 25 to about 27 inches, and the width of said outer pontoons is about 23 to about 25 inches.

5. A pontoon boat according to claim 1 wherein said outer pontoons are positioned such that a line connecting the lowermost points of the central pontoon and each respective outer pontoon forms an angle of from 2 to 22 degrees with the horizontal.

6. A pontoon boat according to claim 5 wherein said line connecting the lowermost points of the central pontoon and each respective outer pontoon forms an angle of 7.5 degrees with the horizontal.

[7. A pontoon boat according to claim 1 wherein said planing elements comprise lifting strakes on each of said central and outer pontoons, said strakes being angled upwardly.]

8. A pontoon boat according to claim [7] *1* wherein said strakes on said central pontoon are from 6.4 inches to 7.7 inches in width and are angled upwardly by 7[°] to 10.5[°] with respect to the horizontal, and said strakes on said outer pontoons are 4.5 inches to 5.5 inches in width and are angled upwardly by 21° to 32° with respect to the horizontal.

9. A pontoon boat according to claim 1 wherein the width of said central pontoon is greater than the width of each of said outer pontoons.

10. A pontoon boat according to claim 1 wherein said central pontoon extends below transversely adjacent portions of said outer pontoons by a distance greater than two inches.

11. A pontoon boat according to claim 10 wherein said central pontoon extends below transversely adjacent portions of said outer pontoons by a distance less than eight inches.

12. A pontoon boat according to claim 1 wherein the lowermost point of said central pontoon extends below the lowermost point of said transversely adjacent portion of each respective outer pontoon by a distance of about five inches.

13. A pontoon boat comprising a deck, a central pontoon, two outer pontoons on respective opposite sides of said central pontoon, said deck extending above said central and said two outer pontoons, and a motor, wherein said central pontoon and said outer pontoons are of generally cylindrical configuration at least on their lower halves and comprise planing elements, and said central and outer pontoons support the entire weight of the boat and passengers by displacement when the boat is stationary, are positioned in substantially fixed relationship with respect to each other such that said central pontoon extends below transversely adjacent portions of said outer pontoons in at least a substantial portion of the aft section of said boat to provide a V-shape to the overall cross-sectional configuration of said central and outer pontoons and to provide greater buoyancy in the central longitudinal part of said boat than at either of the outer longitudinal parts of said boat, and the displacement and planing characteristics of said central and outer pontoons are such that said central pontoon and at least one of said outer pontoons are always in displacement or planing contact with water during normal operation and the boat heels into turns, and said motor is capable of causing said center and outer pontoons to plane during said normal operation *wherein said planing elements comprise lifting strakes on each of said central and outer pontoons, said strakes being angled upwardly from a respective pontoon.*

14. A pontoon boat according to claim 13 wherein the overall length of said pontoon boat is about 18 to about 32 feet in length, the width of said central pontoon is about 20 to about 32 inches, and the width of said outer pontoons is about 18 to about 30 inches.

15. A pontoon boat according to claim 14 wherein said overall length is about 22 to about 26 feet, the width of said central pontoon is about 25 to 27 inches, and the width of said outer pontoons is about 23 to about 25 inches.

16. A pontoon boat according to claim 15 wherein said overall length is about 24 feet, the width of said central pontoon is about 27 inches, and the width of said outer pontoons is about 23 inches.

17. A pontoon boat according to claim 13 wherein the width of said central pontoon is greater than the width of each of said outer pontoons.

18. A pontoon boat according to claim 13 wherein the weight to horsepower ratio of said boat is about 31 pounds per horsepower or less.

19. A pontoon boat according to claim 18 wherein said weight to horsepower ratio is from about 19 to about 21.

20. A pontoon boat according to claim 13 wherein said outer pontoons are positioned such that a line connecting the lowermost points of the central pontoon and each respective outer pontoon forms an angle of from 2 to 22 degrees with the horizontal.

21. A pontoon boat according to claim 20 wherein said line connecting the lowermost points of the central pontoon and each respective outer pontoon forms an angle of 7.5 degrees with the horizontal.

22. A pontoon boat according to claim 13 wherein said central pontoon extends below transversely adjacent portions of said outer pontoons by a distance greater than two inches.

23. A pontoon boat according to claim 22 wherein said central pontoon extends below transversely adjacent portions of said outer pontoons by a distance less than eight inches.

24. A pontoon boat according to claim 13 wherein the lowermost point of said central pontoon extends below the lowermost point of said transversely adjacent portion of each respective outer pontoon by a distance of about five inches.

[25. A pontoon boat according to claim 13 wherein said planing elements comprise lifting strakes on each of said central and outer pontoons, said strakes being angled upwardly.]

26. A pontoon boat according to claim [25] *13* wherein said strakes on said central pontoon are from 6.4 inches to 7.7 inches in width and are angled upwardly by 7[°] to 10.5[°] with respect to the horizontal, and said strakes on said outer pontoons are 4.5 inches to 5.5 inches in width and are angled upwardly by 21° to 32° with respect to the horizontal.

*27. A pontoon boat according to claim 1 wherein said strakes on said central pontoon are angled upwardly with respect to the horizontal at smaller angles than are said strakes on said outer pontoons.*

*28. A pontoon boat according to claim 13 wherein said strakes on said central pontoon are angled upwardly with respect to the horizontal at smaller angles than are said strakes on said outer pontoons.*

* * * * *